United States Patent [19]

Gingell

[11] 4,104,729
[45] Aug. 1, 1978

[54] DIGITAL MULTIPLIER

[75] Inventor: Michael J. Gingell, Sawbridgeworth, England

[73] Assignee: International Standard Electric Corporation, New York, N.Y.

[21] Appl. No.: 796,920

[22] Filed: May 16, 1977

Related U.S. Application Data

[63] Continuation of Ser. No. 688,520, May 20, 1976, abandoned.

[30] Foreign Application Priority Data

Aug. 27, 1975 [GB] United Kingdom ............... 35345/75

[51] Int. Cl.$^2$ ............................................... G06F 7/52
[52] U.S. Cl. ..................................... 364/757; 364/724
[58] Field of Search ......................... 235/164; 364/757

[56] References Cited

U.S. PATENT DOCUMENTS

| | | | |
|---|---|---|---|
| 3,816,732 | 6/1974 | Jackson | 235/164 X |
| 3,878,985 | 4/1975 | Ghest et al. | 235/164 |
| 3,919,535 | 11/1975 | Vattuone | 235/164 |
| 3,947,670 | 3/1976 | Irwin et al. | 235/164 |

Primary Examiner—Jerry Smith
Attorney, Agent, or Firm—John T. O'Halloran; Jeffrey P. Morris

[57] ABSTRACT

The digital multiplier is of the add and shift type with a matrix type input in which a number of serial data words can be applied simultaneously to the multiplier enabling the multiplier to compute simultaneously the sum of a number of products. This multiplier is intended for use in digital filters and single channel coders.

17 Claims, 5 Drawing Figures

1

DIGITAL MULTIPLIER

This is a continuation, of application Ser. No. 688,520, filed May 20, 1976 and now abandoned.

BACKGROUND OF THE INVENTION

The present invention relates to digital multipliers of the "add and shift" type such as may be used in digital filters for telecommunications systems.

In such multipliers multiplication is achieved by performing a number of addition operations using an adder with an accumulator in which the adder output is stored and shifted one bit position for each addition operation. An adder comprises a series of cells, one for each bit in a digital word, each cell having inputs for the addend and the augend and outputs for the sum and carry. A so-called "full adder cell" has in addition a third input to which the carry from the cell of next lesser significance may be applied.

In a known form of multiplier where, say, a parallel coefficient B is to be multiplied by an incoming serial data word C to form the product $A = B \times C$ in the accumulator, the multiplicand B is applied in parallel to a number of AND gates for the duration of the word C. Each bit of the word C, starting with the least significant bit, is applied to all the AND gates. If a bit of word C is a logic "1" then the multiplicand B is added to the accumulator (if it is a logic "0" nothing is added) and the contents of the accumulator are right shifted before the next bit of word C is applied to the AND gates. This continues until all the bits of word C have been applied to the gates, then the multiplication is complete. The answer A is now in the accumulator and may be extracted as required by various known methods.

Negative numbers can be handled by various known simple modifications. For example, if 2's complement data is used then the most significant bit of the data has a negative weight and for this bit only the multiplicand B is subtracted from instead of added to the accumulator.

In digital filters a digitally encoded sampled signal is filtered by combining together various delayed copies of the signal through suitable weighting coefficients. In general in a digital filter it is thus necessary to form an accumulated product such as:

$$P = (D_1 \times E_1) + (D_2 \times E_2) + (D_3 \times E_3) \ldots (D_n \times E_n),$$

where $D_1$, $D_2$ etc. are filter signal serial data words and $E_1$, $E_2$ etc. are the filter tap coefficients. In the simple type of multiplier described above this type of operation can only be accomplished by performing first the multiplication $D_1 \times E_1$, storing the result, changing the coefficient E, applied in parallel to the AND gates, performing the next multiplication $D_2 \times E_2$, adding the result to the previously stored product $D_1 \times E_1$, storing the sum, and repeating this process as many times as required. It is obvious that it would be advantageous to be able to perform all n multiplications simultaneously and produce the product P at the end of one serial data word period rather than to have to wait for n word periods.

SUMMARY OF THE INVENTION

An object of the present invention is to provide an improved digital multiplier capable of being employed in digital filters and single channel coders.

A feature of the present invention is the provision of a digital multiplier providing a calculated output signal comprising: a first adder having a plurality of first adder cells; an accumulator coupled to each of the first adder cells to store the output of each of the first adder cells and to shift the stored output one bit for each addition operation; and input means coupled to the first adder cells for applying simultaneously a plurality of serial data words to the first adder cells, the input means being arranged so that each of the serial words is applied to predetermined ones of the first adder cells but no two serial words are applied to the same one of the first adder cells.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
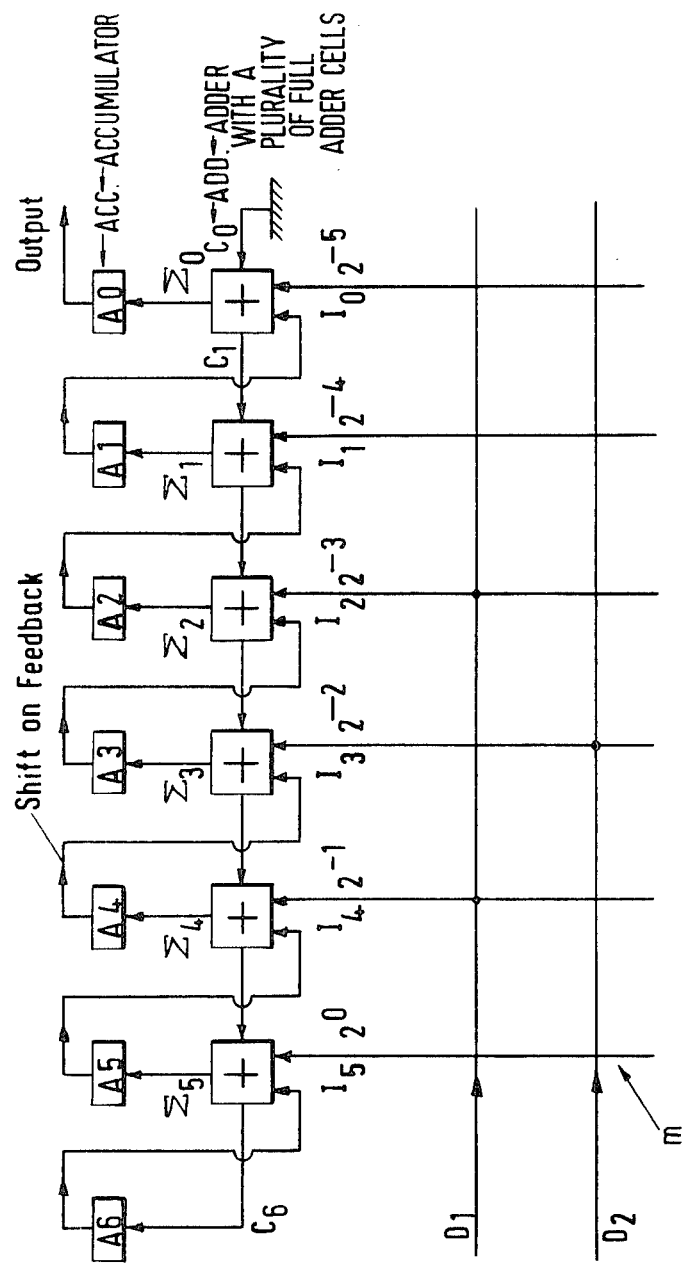
FIG. 1 is a block schematic diagram of a simple digital multiplier according to the principles of the present invention using a single full adder to perform addition operations, a single accumulator in which the sum outputs of the full-adder are simultaneously accumulated and right shifted, and a basic form of wired input matrix.

In the simple multiplier arrangement shown in FIG. 1 a 6-stage adder ADD is constructed with "full-adder" cells the carry from each cell being applied to the cell of next greater significance.

A 7-stage accumulator ACC receives, in stages A0 to A5, the sum outputs $\Sigma_0 \ldots \Sigma_5$ of the adder cells. The most significant stage A6 of the accumulator receives the carry output $C_6$ of the most significant adder cell. The contents of the accumulator stages A6 ... A1 are fed back at the data bit rate as inputs to the adder cells of next lesser significance while the multiplier output is taken serially from stage A0 of the accumulator ACC. Each adder cell has, in addition to the carry and feedback (augend) inputs a data (addend) input which is fed via an input matrix M with serial data words $D_1$ and $D_2$ simultaneously. Suppose that it is desired to perform the calculation: $P = \frac{5}{8}D_1 + \frac{1}{4}D_2$, where $\frac{5}{8}$ and $\frac{1}{4}$ are fixed coefficients.

The first part of the calculation, i.e., multiplying $D_1$ by $\frac{5}{8}$ can be broken down into two separate operations as follows:

$\frac{5}{8}D_1 = \frac{1}{2}D_1 + \frac{1}{8}D_1$

Multiplying $D_1$ by $\frac{1}{2}$ is simply effected by right-shifting $D_1$ by one bit position while multiplying $D_1$ by $\frac{1}{8}$ is effected by right-shifting $D_1$ by three bit positions. If the input $I_5$ to the most significant cell of the adder ADD is regarded as having a weighting value of 1, i.e., it has a value of $2^o$, then to multiply $D_1$ by $\frac{1}{2}$ it must be fed to input $I_4$ which has a weight of $\frac{1}{2}$ or $2^{-1}$. To multiply $D_1$ by $\frac{1}{8}$ it must be fed to input $I_1$, which has a weight of $\frac{1}{8}$ or $2^{-3}$. When $D_1$ is fed simultaneously to these inputs $I_4$ and $I_2$ the result in the accumulator ACC will be $\frac{1}{2}D_1 + \frac{1}{8}D_1 = \frac{5}{8}D$.

Similarly $D_2$ is fed simultaneously to input $I_3$ and the accumulator ACC will then contain the result of P of the full calculation. It will be noted that each word is fed to one or more inputs to the adder, but that no two words are fed to the same input.

It will be appreciated that such a simple arrangement as that shown in FIG. 1 has severe limitations in practice. Greater flexibility can be obtained by using ternary coding of the coefficients. Suppose that it is desired to perform the calculation:

$$P = \tfrac{5}{8}D_1 + 9/16 D_2 - \tfrac{1}{4}D_3.$$

Figure 2:
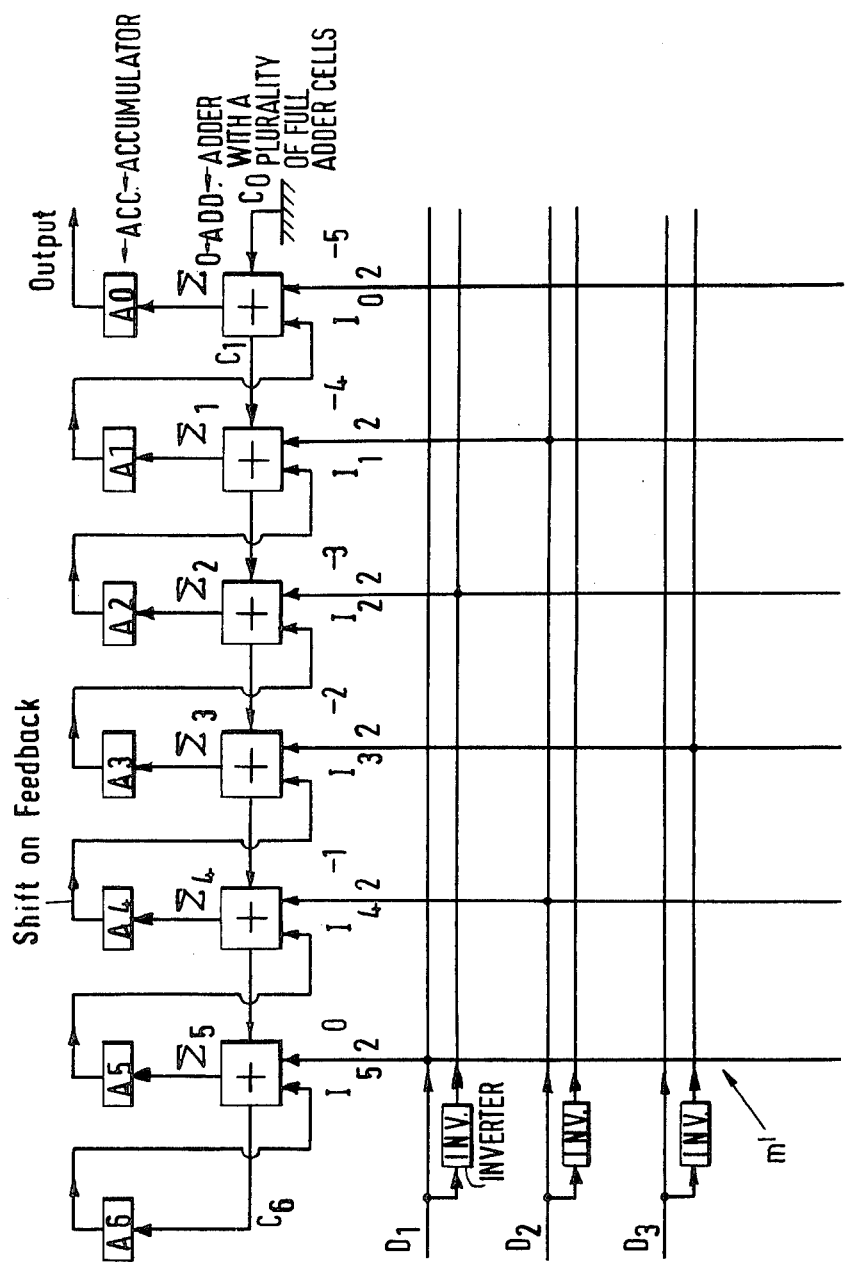
FIG. 2 is a block schematic diagram of a modification of the multiplier of FIG. 1 in which the basic input matrix is modified to improve flexibility.

This can be achieved by expressing the coefficients in a ternary code as follows:

$\tfrac{5}{8} = 100\overline{1}00 = 1 - \tfrac{1}{8}$ $9/16 = 010010 = \tfrac{1}{2} + 1/16$ $-\tfrac{1}{4} = 00\overline{1}000 = -\tfrac{1}{4}$ In this table the use of the bar, i.e., $\overline{1}$, indicates that the relevant bit has a negative weight. This calculation can then be performed using the arrangement shown in FIG. 2. The adder ADD and accumulator ACC are the same as in FIG. 1, but the input matrix M' is more complex, each data word being fed either direct and/or inverted (complemented) to the appropriate adder inputs.

Word $D_1$ is fed directly to input $I_5$ and in complemented form to input $I_2$ by means of the inverter INV. In practice what this means is that although the coefficients are expressed in a ternary code the negative weights are realized by reversing the sign of the data. Thus, in effect $\tfrac{5}{8}D_1 = (1\tfrac{1}{8})D_1 = 1 \times D_1 + \tfrac{1}{8} \times (-D_1)$. $D_2 + D_3$ are similarly fed to the input matrix M' with inversion where appropriate. Once again, it is important to note that any one adder input receives not more than one word, either direct or inverted.

Further flexibility can be achieved by using serial adders for cases where the coefficients (which can be regarded as data words) have bits which overlap, even after re-expressing them in ternary form. In other words two incoming data words are required to be fed to the same adder cell. Consider as an example the calculation:

$$P = (D_1 \times E_1) + (D_2 \times E_2) + (D_3 \times E_3) + (D_4 \times E_4) + (D_5 \times E_5)$$

where the coefficients $E_1$-$E_5$ have the values given below and are re-expressed in the ternary forms shown in the following table.

| | VALUE | TERNARY FORM |
|---|---|---|
| $E_1$ | 136/256 | 0 0 0 1 0 0 0 1 0 0 0 |
| $E_2$ | 686/256 | 0 1 1 0 $\overline{1}$ 0 $\overline{1}$ 0 0 $\overline{1}$ 0 |
| $E_3$ | −796/256 | $\overline{1}$ 0 1 0 0 $\overline{1}$ 0 0 1 0 0 |
| $E_4$ | 446/256 | 0 1 0 0 $\overline{1}$ 0 0 0 0 $\overline{1}$ 0 |
| $E_5$ | −103/256 | 0 0 0 $\overline{1}$ 0 1 0 $\overline{1}$ 0 0 1 |
| Input Equivalent Weight | 4 2 1 $\tfrac{1}{2}$ $\tfrac{1}{4}$ $\tfrac{1}{8}$ $\tfrac{1}{16}$ $\tfrac{1}{32}$ $\tfrac{1}{64}$ $\tfrac{1}{128}$ $\tfrac{1}{256}$ | |

It can be seen that in nearly every column there are two overlapping ternary bits but nowhere are there more than two. This calculation can be realized by pre-adding together two data words where they are each to be multiplied by the same weight bit. In this case the result will be formed by performing the calculation as follows:

$$P = 2^2(-D_3) + 2^1(D_2+D_4) + 2^o(D_2+D_3) + 2^{-1}(-D_5+D_1) + 2^{-2}(-D_4-D_2) + 2^{-3}(D_5-D_3) + 2^{-4}(-D_2) + 2^{-5}(-D_5+D_1) + 2^{-6}(D_3) + 2^{-7}(-D_2-D_4) + 2^{-8}(D_5)$$

Figure 3:
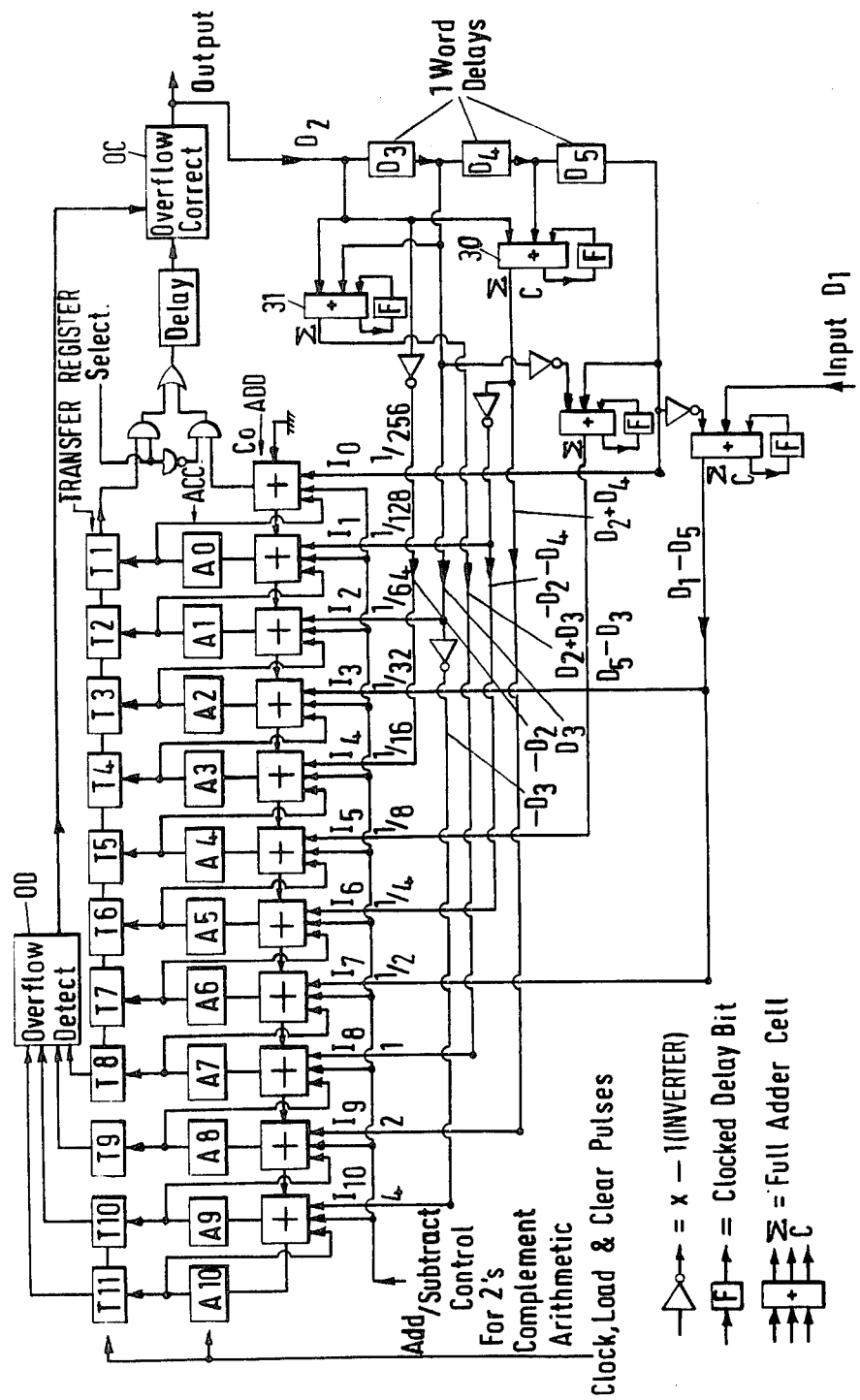
FIG. 3 is a block schematic diagram of a fourth order recursive digital filter section which utilizes a digital multiplier having a separate accumulator and transfer register with provision for overflow detection in accordance with the principles of the present invention.

An arrangement for performing the calculation in this manner is shown in FIG. 3. The arrangement of FIG. 3 is designed as a fourth order recursive digital filter section in which in fact $D_1$ is the only external input and $D_2$ - $D_5$ are derived from the multiplier output. $D_2$ is the multiplier output proper, and $D_3$ - $D_5$ are successively delayed versions of $D_2$, in each case delayed by one word period. To perform the calculation the input $I_{10}$, having the weight of $2^2$, receives word $D_3$ via an inverter, input $I_9$ receives the serial sum of words $D_2$ and $D_4$ produced by the serial adder cell 30, input $I_8$ receives the serial sum of words $D_2$ and $D_3$ produced by serial adder cell 31 and so on. To prevent overflow in the serial adder cells the data must be pre-limited to $\pm\tfrac{1}{2}$-full scale range so that on addition of any two words the sum is still within the full range.

The filter section shown in FIG. 3 is designed to work with offset binary data, that is for an N-bit word the value is:

$$D = \sum_{r=1}^{N} 2^{-N+1}(2B_r - 1)$$

where the $r$th bit $B_r$ is worth "0" or "1". Thus, the weighted value of that bit is $-2^{-N-1}$ or $+2^{-M+1}$, respectively. Sign reversal (that is multiplication by $-1$) is achieved by complementary (inverting) the data bits.

In a practical digital filter the output under some circumstances may exceed the allowable data range and for that case overflow protection must be provided. This can be accomplished in the following manner. When multiplication starts the least significant bits of the answer start coming from the least significant adder output. At the completion of the multiplication period the remaining most significant bits of the answer are in the accumulator (A0 - A10) and must be transferred over to a transfer register ($T_1$ - $T_{11}$) so that the accumulator can be cleared to start a new multiplication. While the multiplier is working on this new multiplication the bits in the transfer register are shifted out to complete the previous answer. In general, however, when working with fixed point arithmetic, it is necessary to limit the maximum answer to the available range expressible by the data format. In digital filters, particularly of the recursive types the answer may exceed the available data range so that if the most significant few bits of the accumulated result are simply ignored an undesirable overflow characteristic may occur leading to instability. However, by storing the bits to be dropped and checking the answer to see if the allowable range has been exceeded the multiplier can be made to saturate giving a maximum positive or negative result. This is done in the arrangement of FIG. 3 by checking the states of bits $T_8$ to $T_{11}$ in overflow detector OD to detect whether overflow will occur if $T_9$ to $T_{11}$ are dropped and using the result to control the multiplier output in an overflow correction circuit OC. If no overflow occurs then the normal output is allowed to flow out but if overflow has occurred then a maximum positive or negative data signal is substituted for the completed answer according to the sign.

Another way of achieving flexibility while adhering to the general rule stated earlier is to provide multiple inputs per stage of the multiplier using a second rank of parallel adder cells. Where there are overlapping bits in the ternary expressed coefficients the data can be fed into individual inputs without the need for serial pre-addition and, hence, pre-limiting of the data input magnitude. Such an arrangement is shown in FIG. 4.

Figure 4:
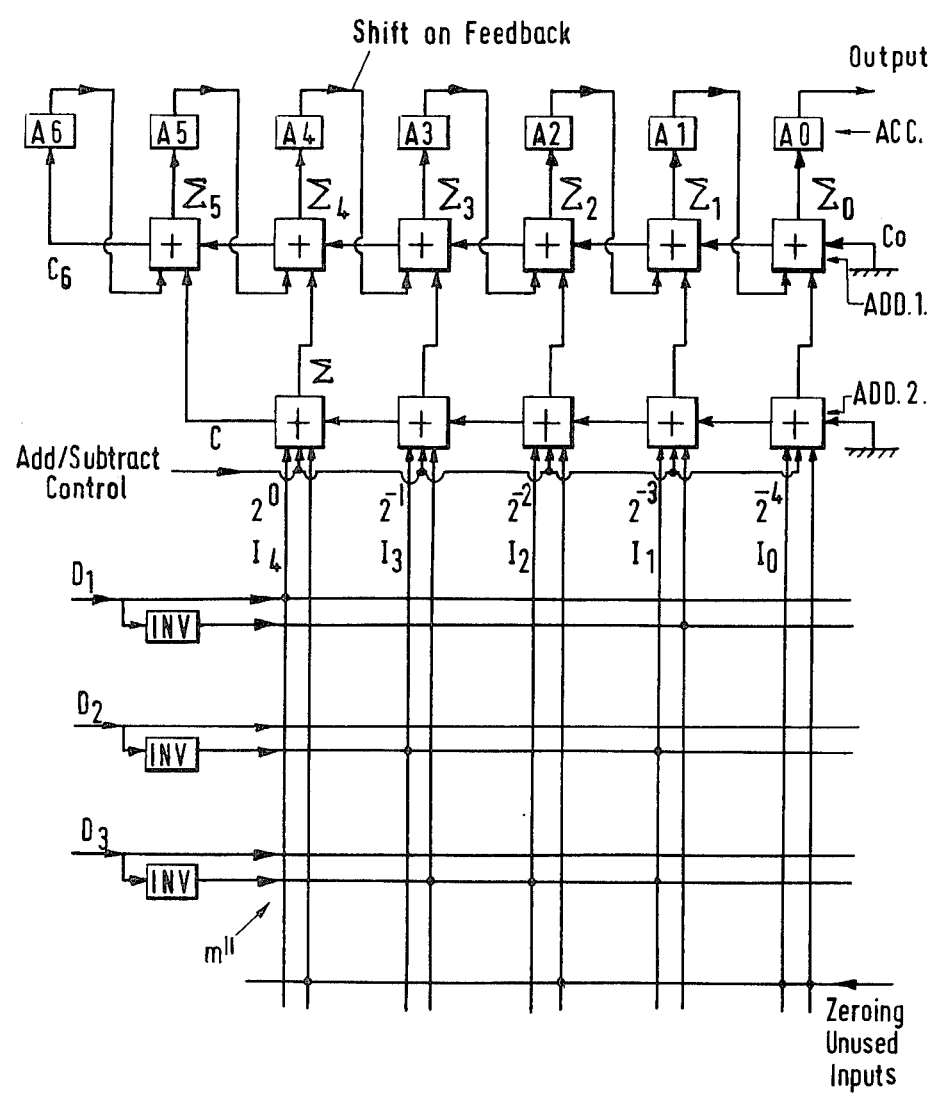
FIG. 4 is a block schematic diagram of a further modification of the basic multiplier of FIG. 1 using a second full adder with a modified input matrix to enable the number of inputs to the multiplier to be increased still further.

The basic multiplier design of FIG. 4 is similar to that of the preceding figures but with the additional rank of adder cells ADD 2 preceding the final rank of adder cells ADD 1. Note that the final rank of adder cells ADD 1 has to have one more cell than the additional rank of adder cells ADD 2. The inputs to the multipliers are by way of the input matrix M" feeding the cells of the addition rank of adder cells ADD 2.

Consider the following calculation:

$$P = \tfrac{1}{8}D_1 - \tfrac{3}{8}D_2 + \tfrac{5}{8}D_3$$

By constructing a general purpose X-Y interconnection matrix as shown in FIG. 4 and making connections only at the appropriate crossings a very flexible arrangement results. Each input data line drives one input line directly and a second input line through a sign reverser (inverter) so that either data or minus data can be connected to give coefficients expressed in ternary. This scheme will work with any form of binary coded data, such as ordinary binary, 2's complement binary, offset-binary, negabinary (radix $-2$) etc., provided the logic in the sign reversers and adders is appropriate to the type of coding. Conversion between different codes can be simultaneously accomplished by feeding in appropriate conversion constants to unused inputs and inverting the polarity of data bits where necessary.

In the arrangement illustrated the least significant bit carry inputs of the adders are shown grounded. They may in fact be used (a) as extra data inputs, (b) for feeding in a rounding signal, (c) for providing an automatic clear of the accumulator ACC.

This last item can considerably simplify the hardware and timing of multipliers since it eliminates the need for individual clear elements in each accumulator cell.

The method will be described using a modified design of FIG. 4 with carry-save adders instead of fully parallel ripple or look-ahead carry types. The method can equally well be used with ripple through carry addition, but it is useful to consider a carry-save addition type which minimizes problems of logic propagation delay.

Figure 5:
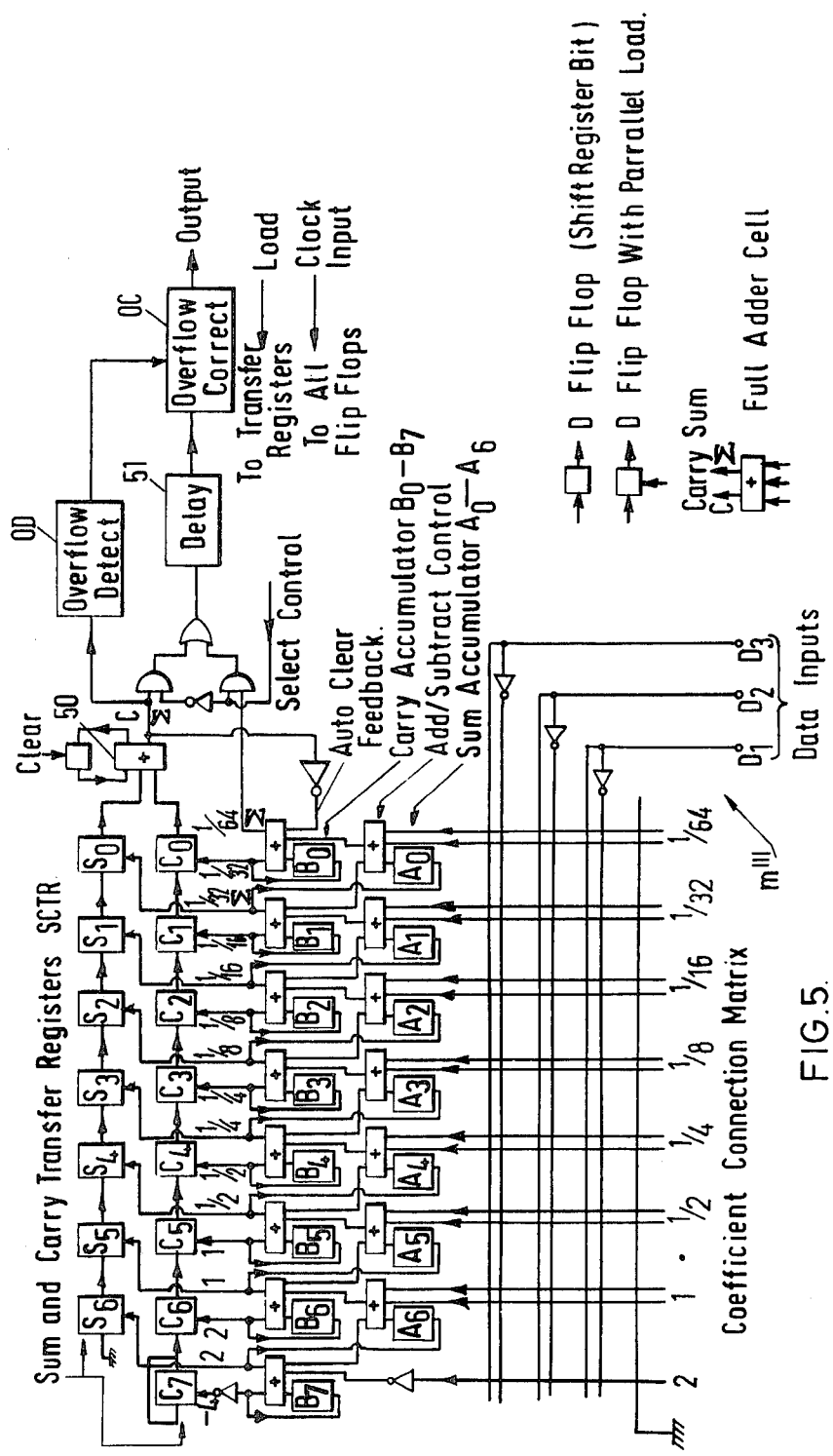
FIG. 5 is a block schematic diagram of a complete digital multiplier for handling digital data using 2's complement and carry-save addition with separate sum and carry accumulators and separate sum and carry transfer registers in accordance with the principles of the present invention.

FIG. 5 shows a complete multiplier design using 2's complement arithmetic and carry-save addition. This design allows two inputs per bit but this can be increased by additional ranks of ordinary or carry-save adders. Input data is routed to the adder inputs via the coefficient connection matrix M'" previously described. Multiplication of data by $-1$ is achieved by inverting (complementing) the data bits. This is not strictly accurate with 2's complement data since it introduces an error of one least significant bit. This will cause a constant small error in the result. In cases where this is important the inverters can be replaced by true subtract from zero circuits or a compensation signal can be fed into an unused data input. Each carry-save adder cell is a normal full adder with three inputs each worth one unit and pseudo sum and carry outputs worth one and two units, respectively. The first rank takes two data inputs plus the fed back sum accumulator and feeds the second rank. The second rank takes the sum from the first rank plus the left shifted carry (shifted left since the carry is worth 2 units) plus the fed back carry accumulator. The outputs are loaded into the sum and carry accumulators A0–A6 and B0–B7, respectively. On feedback the sum is shifted one place right as in previous examples, but the carry shift right is neutralized by the fact that being worth twice as much as the sum it needs shifting one place left.

On completion of the multiplication the answer is the sum of the contents of the sum and carry accumulators plus the least significant bits which have flowed out the least-significant-bit-sum output through the selector and into the output delay. The contents of the sum and carry accumulators are loaded into sum and carry transfer registers SCTR and shifting begins, adding the two together in serial adder 50 and routing the result through the output delay 51. At the same time a new multiplication can start. However, since at this point the sum contained in the two transfer registers is the same as the sum contained in the two accumulators it is possible by feeding back minus the sum of the two transfer registers into the accumulators to remove the old result from the calculation without the physical necessity for clearing the accumulator cells $A_0$ to $A_6$ and $B_0$ to $B_7$. Additional refinements can include overflow detection and correction and also rounding the answer to a given number of bits.

While I have described above the principles of my invention in connection with specific apparatus it is to be clearly understood that this description is made only by way of example and not as a limitation to the scope of my invention as set forth in the objects thereof and in the accompanying claims.

I claim:

1. A digital multiplier providing a calculated output signal comprising:

a first adder having a plurality of first adder cells;

an accumulator coupled to each of said first adder cells to store the output of each of said first adder cells and to shift said stored output one bit for each addition operation said calculated output signal being provided by said accumulator;

input means coupled to said first adder cells for applying simultaneously a plurality of serial data words to said first adder cells, said input means being arranged so that each of said serial words is applied to predetermined ones of said first adder cells but no two serial words are applied to the same one of said first adder cells;

first means coupled to said accumulator for examining a given number of the most significant bits of said calculated output signal to determine if the complete calculated output signal value will exceed a predetermined range of values; and second means coupled to said accumulator and a given one of said first adder cells for substituting for said calculated output signal a selected one of a maximum positive and negative data signal according to the sign of said calculated output signal when the value of the latter exceeds said predetermined range of values.

2. A multiplier according to claim 1, wherein said input means includes an input matrix having a plurality of column conductors and a plurality of row conductors each of said column conductors being coupled to a different one of said first adder cells and each of said row conductors being coupled to a different one of said serial words, the interconnection of each of said row conductors with said column conductors being arranged in a pattern corresponding to a predetermined digital word, said interconnection pattern for each of said row conductors being different from said interconnection pattern of every other one of said row conductors with no more than one of said row conductors having an interconnection with any one of said column conductors.

3. A multiplier according to claim 2, further including:

first means coupled to said accumulator for examining a given number of the most significant bits of said calculated output signal to determine if the complete calculated output signal value will exceed a predetermined range of values; and second means coupled to said accumulator and a given one of said first adder cells for substituting for said calculated output signal a selected one of a maximum positive and negative data signal according to the sign of said calculated output signal when the value of the latter exceeds said predetermined range of values.

4. A multiplier according to claim 2, further including a second adder having a plurality of second adder cells, said second adder cells being equal in number to one less than the number of said first adder cells, the output of each of said second adder cells being coupled to the input of a different one of less significant ones of said first adder cells, and wherein said input matrix couples said serial words to said second adder cells, said input matrix including a plurality of two column conductors, each of said two column conductors being coupled to a different one of said second adder cells to enable two of said serial words that are simultaneously present on said row conductors to be serially added together to provide sum outputs at the output of certain of said second adder cells, said input matrix having not more than one of said row conductors with an interconnection with any one of said plurality of two column conductors.

5. A multiplier according to claim 4 wherein first means coupled to said accumulator for examining a given number of the most significant bits of said calculated output signal to determine if the complete calculated output signal value will exceed a predetermined range of values; and second means coupled to said accumulator and a given one of said first adder cells for substituting for said calculated output signal a selected one of a maximum positive and negative data signal according to the sign of said calculated output signal when the value of the latter exceeds said predetermined range of values.

6. A multiplier according to claim 2, further including at least one additional row conductor for each of said plurality of row conductors, each of said additional row conductors having a different one of said serial words coupled thereto, and a plurality of complementing means each coupled to a different one of said additional row conductors for complementing the digits of an associated one of said serial words said interconnection pattern for each of said additional row conductors with said column conductors being different than said interconnection pattern of every other one of said additional row conductors with no more than one of said plurality of row conductors and said additional row conductors having an interconnection with any one of said column conductors.

7. A multiplier according to claim 6, wherein first means coupled to said accumulator for examining a given number of the most significant bits of said calculated output signal to determine if the complete calculated output signal value will exceed a predetermined range of values; and second means coupled to said accumulator and a given one of said first adder cells for substituting for said calculated output signal a selected one of a maximum positive and negative data signal according to the sign of said calculated output signal when the value of the latter exceeds said predetermined range of values.

8. A multiplier according to claim 6, further including a second adder having a plurality of second adder cells, said second adder cells being equal in number to one less than the number of said first adder cells, the output of each of said second adder cells being coupled to the input of a different one of less significant ones of said first adder cells, and wherein said input matrix couples said serial words to said second adder cells, said input matrix including a plurality of two column conductors each of said two column conductors being coupled to a different one of said second adder cells to enable two of said serial words that are simultaneously present on said row conductors to be serially added together to provide sum outputs at the output of certain of said second adder cells, said input matrix having not more than one of said row conductors with an interconnection with any one of said plurality of two column conductors.

9. A multiplier according to claim 8, wherein first means coupled to said accumulator for examining a given number of the most significant bits of said calculated output signal to determine if the complete calculated output signal value will exceed a predetermined range of values; and second means coupled to said accumulator and a given one of said first adder cells for substituting for said calculated output signal a selected one of a maximum positive and negative data signal according to the sign of said calculated output signal when the value of the latter exceeds said predetermined range of values.

10. A multiplier according to claim 8, further including
a sum accumulator;
a carry accumulator;
a sum transfer register;
a carry transfer register; and
an additional serial adder cell; and wherein
a carry output from each of said second adder cells are each coupled as an input to one of said first adder cells of next greater significance than the significance of the associated one of said second adder cells;
a sum output from each of said first adder cells are each fed back as a carry input of one of said second adder cells of next lesser significance than the significance of the associated one of said first adder cells through said sum accumulator,
a carry output from each of said first adder cell is fed back to a carry input of the same one of said first adder cell through said carry accumulator,
a sum output of each of said first adder cells are coupled to said sum transfer register,
a carry output of each of said first adder cells are coupled to said carry transfer register, and
said additional serial adder cell is coupled to said sum and carry transfer registers to add the contents of said sum and carry transfer registers as the contents thereof are transferred serially to an output of said multiplier.

11. A digital multiplier according to claim 10, wherein
first means coupled to said accumulator for examining a given number of the most significant bits of said calculated output signal to determine if the complete calculated output signal value will exceed a predetermined range of values; and
second means coupled to said accumulator and a given one of said first adder cells for substituting for said calculated output signal a selected one of a maximum positive and negative data signal according to the sign of said calculated output signal when the value of the latter exceeds said predetermined range of values.

12. A digital multiplier according to claim 10, wherein the output of said additional serial adder cell is complemented and fed back as an input to the least significant one of said first adder cell.

13. A digital multiplier according to claim 12, wherein
first means coupled to said accumulator for examining a given number of the most significant bits of said calculated output signal to determine if the complete calculated output signal value will exceed a predetermined range of values; and
second means coupled to said accumulator and a given one of said first adder cells for substituting for said calculated output signal a selected one of a maximum positive and negative data signal according to the sign of said calculated output signal when the value of the latter exceeds said predetermined range of values.

14. A digital multiplier comprising:
input means for serially receiving a plurality of serial $n$-bit digital inputs at a predetermined clock rate for deriving a plurality of parallel $n$-bit serial digital inputs therefrom;
weighting means for weighting each of said $n$-bit serial digital inputs with a plurality of constant coefficients, such that each of said $n$-bit serial digital inputs is weighted with one of said plurality of coefficients;
accumulator means having said plurality of weighted $n$-bit serial digital inputs coupled thereto in parallel for adding said parallel $n$-bit serial inputs in parallel to obtain a calculated digital output; and
output means for serially coupling said calculated digital output from said accumulator at said predetermined clock rate.

15. A digital multiplier in accordance with claim 14 wherein said input means includes a plurality of shift register delays each of which shift register delays being adapted to derive one of said parallel $n$-bit serial digital inputs.

16. A digital multiplier in accordance with claim 15 wherein said weighting means includes a weighting matrix for deriving said constant coefficients, one of said constant coefficients being derived for each of said parallel $n$-bit serial inputs.

17. A digital multiplier in accordance with claim 15 wherein the addition of said plurality of weighted parallel $n$-bit serial digital inputs by said accumulator to derive said calculated digital output is performed in an $n$-bit time duration.

* * * * *